United States Patent
Miller et al.

(10) Patent No.: US 6,994,253 B2
(45) Date of Patent: *Feb. 7, 2006

(54) SYSTEMS AND METHODS OF ITEM DELIVERY UTILIZING A DELIVERY NOTICE

(75) Inventors: Matthew T. Miller, Cumming, GA (US); Craig M. Barta, Alpharetta, GA (US); Daniel Garcia, Norcoss, GA (US); Scott Aubuchon, Alpharetta, GA (US)

(73) Assignee: United Parcel Service of America, Atlanta, GA (US)

( * ) Notice: Subject to any disclaimer, the term of this patent is extended or adjusted under 35 U.S.C. 154(b) by 75 days.

This patent is subject to a terminal disclaimer.

(21) Appl. No.: 10/689,514

(22) Filed: Oct. 20, 2003

(65) Prior Publication Data
US 2004/0149824 A1    Aug. 5, 2004

Related U.S. Application Data

(63) Continuation-in-part of application No. 09/815,745, filed on Mar. 23, 2001, now Pat. No. 6,634,551, said application No. 10/689,514.

(60) Provisional application No. 60/426,599, filed on Nov. 15, 2002, provisional application No. 60/203,402, filed on May 11, 2000.

(51) Int. Cl.
*G06F 17/60* (2006.01)

(52) U.S. Cl. ..................... 235/385
(58) Field of Classification Search .......... 235/375, 235/385; 705/22; 358/400
See application file for complete search history.

(56) References Cited

U.S. PATENT DOCUMENTS 4,556,944 A    12/1985  Daniels et al.
(Continued)

FOREIGN PATENT DOCUMENTS

JP         05-165847         7/1993
(Continued)

OTHER PUBLICATIONS

Canada Post Corporation, https://obc.canadapost.ca/emo/basicPin.do?language=en Accessed in Jul. 2004. Applicant makes no admission that this reference constitutes prior art.
(Continued)

*Primary Examiner*—Diane I. Lee
*Assistant Examiner*—Lisa M. Caputo
(74) *Attorney, Agent, or Firm*—Alston & Bird LLP

(57) ABSTRACT

Generally described, under on aspect of the invention, a single unique delivery notice is left at the particular location. However, this notice is "linked" to the parcel(s) that were undeliverable. This can be done by a handheld portable data acquisition device that includes a scanning or reading means, allowing information to be acquired from the delivery notice as well as from the parcels, and stored on the handheld portable data acquisition device. If ten parcels were undeliverable, only one delivery notice is left behind but is "linked" to all ten packages. The intended recipient can then contact the delivery service via the Internet (or other suitable network) or by phone, by using information provided on the delivery notice. By providing the delivery service with unique information from the delivery notice, the intended recipient can get valuable information regarding the undelivered parcels. Such information can include shipper name, how many packages from each shipper, time of attempted delivery, COD status, etc. Arrangements can then be made to have the package(s) redelivered, held at a local operation center, redirected, or returned.

32 Claims, 13 Drawing Sheets

U.S. PATENT DOCUMENTS

| | | | |
|---|---|---|---|
| 4,921,107 A | | 5/1990 | Hofer |
| 5,208,449 A | | 5/1993 | Eastman et al. |
| 5,263,118 A | | 11/1993 | Cornelison |
| 5,305,244 A | | 4/1994 | Newman et al. |
| 5,362,949 A | * | 11/1994 | Gulick ........................ 235/385 |
| 5,497,140 A | * | 3/1996 | Tuttle ......................... 340/10.1 |
| 5,677,834 A | * | 10/1997 | Mooneyham ................ 700/83 |
| 5,869,819 A | | 2/1999 | Knowles et al. |
| 6,021,942 A | | 2/2000 | Monico |
| 2002/0138173 A1 | | 9/2002 | Barta et al. |
| 2003/0037009 A1 | | 2/2003 | Tobin et al. |

FOREIGN PATENT DOCUMENTS

| | | |
|---|---|---|
| JP | 08-307545 | 11/1996 |
| JP | 11-175621 | 7/1999 |
| WO | WO/0046728 | 8/2000 |
| WO | WO 01/86542 A2 | 11/2001 |
| WO | WO 01/990371 A1 | 12/2001 |
| WO | WO 02/08994 A3 | 1/2002 |
| WO | WO 02/21421 A1 | 3/2002 |

OTHER PUBLICATIONS

Research and Markets; eFulfillment: Service Stations as Collection Points; http://www.researchandmarkets.com/reports/2421; Dated Sep., 2001; Accessed Sep., 2004. Applicant makes no admission that this reference constitutes prior art.

International Searching Authority; International Search Report; mailed Mar. 18, 2005; regarding International Application No. PCT/US2004/044022, "Systems and Methods of Modifying Item Delivery Utilizing Linking" (European Patent Office); 4 pages.

International Searching Authority; International Search Report; mailed Apr. 7, 2005; regarding International Application No. PCT/US2004/029767, "Systems and Methods of Item Delivery Utilizing a Delivery Notice" (European Patent Office); 4 pages.

* cited by examiner

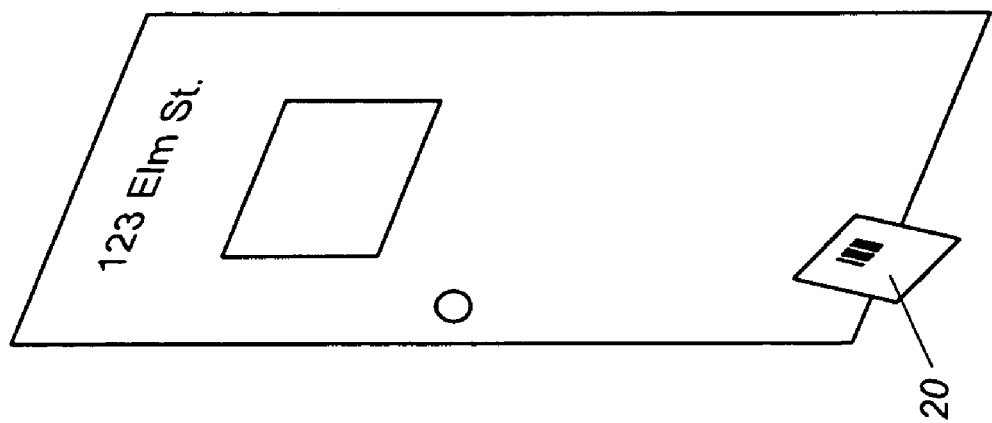
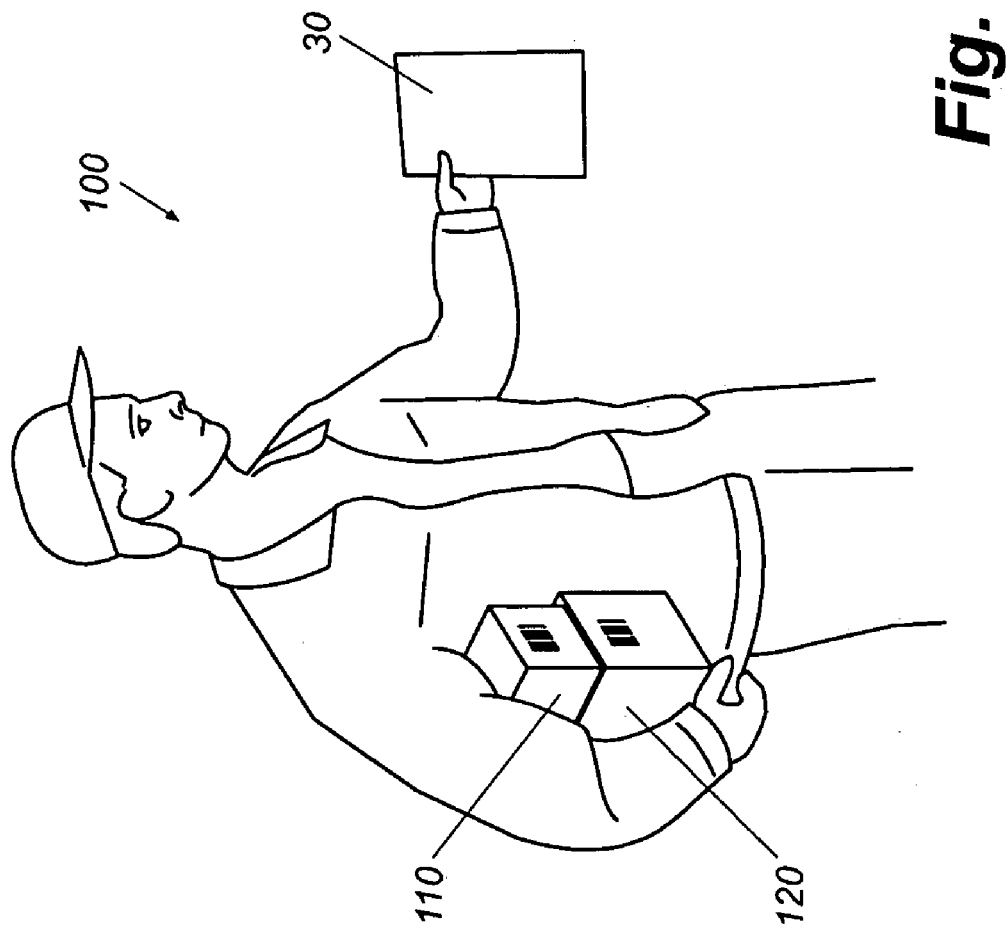
Fig. 1

Service Attempts:
UPS makes up to three delivery attempts (excluding Sat./Sun. & holidays).
To prevent your package from being returned to sender, call 1-800-833-9943 and arrange for pickup. Delivery change requests must be made prior to 7:00 p.m.
Except for C.O.D.s, UPS will hold your package for five business days after final delivery attempt.
UPS automatically returns all C.O.D. packages to sender the same day the final delivery attempt is made.

Signatures Required:
If the "Signature required on delivery" box is checked, the driver must receive a signature and hand the package to a person.
If the "Adult signature required on delivery" box is checked, the driver must receive an adult signature and hand the package to the adult (min. 21 years of age).

C.O.D. Check Requirements:
When the "Cashier's check, official bank check or money order only" box is marked, UPS has been instructed by the sender to accept only these methods of payment, payable to sender.

Customer Comments:
To have package delivered to a neighbor, write details in this section. (Does not apply to "Adult signature required" deliveries.)

Sign To Have Package Delivered (When Checked):
When the "Sign to have package delivered" box is checked, you can authorize the driver to leave the package. Sign below and return the notice to original location.

Your signature _____

Print name _____

*Fig. 3B*

InfoNotice Tracking Summary

InfoNotice Package List

InfoNotice Tracking Detail

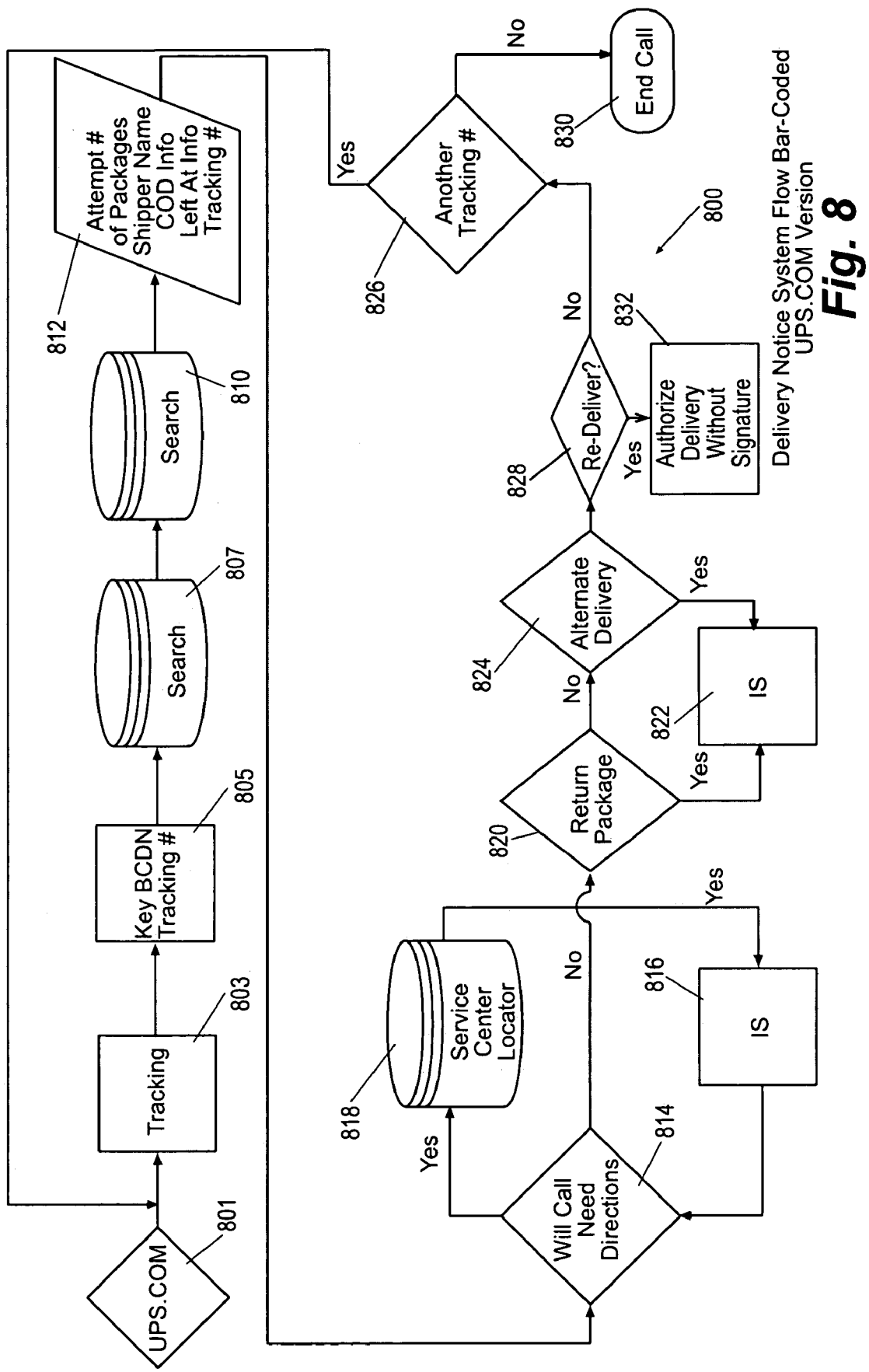

SYSTEMS AND METHODS OF ITEM DELIVERY UTILIZING A DELIVERY NOTICE

CROSS-REFERENCES TO RELATED APPLICATIONS

This application is a continuation-in-part of U.S. patent application Ser. No. 09/815,745, filed on Mar. 23, 2001, now U.S. Pat. No. 6,634,551 that issued on Oct. 21, 2003, which claims the benefit of U.S. Provisional Application No. 60/203,402, filed May 11, 2000, and likewise incorporates both the patent and the provisional application herein in their entirety by reference.

This application also claims the benefit of U.S. Provisional Application No. 60/426,599, filed Nov. 15, 2002, which is incorporated herein in its entirety by reference.

FIELD OF THE INVENTION

The present invention generally relates to delivery of items, and particularly relates to the delivery of items such as parcels (a.k.a. "packages") from a delivery service provider (hereinafter "delivery service"), to an intended recipient (a.k.a. "consignee").

BACKGROUND OF THE INVENTION

The delivery of parcels and other items to the residence of intended recipients is well known in the art.

Under the prior art, when a parcel is undeliverable, a "delivery notice" is left at the particular location, and the intended recipient then has the opportunity to call the delivery service (e.g., UPS) via telephone and arrange to have the package(s) redelivered, held at a local operation center, redirected, or returned. However, the consumer does not know much about the parcel(s) (e.g., who sent it to them) or even how many parcels were undeliverable.

The delivery service can use the address of the customer to determine the delivery center location, as well as the truck that serviced the customers' route. The delivery service will then pull the package from the truck (after matching the customer's name with the parcel(s)) and attend to the necessary handling of the parcel.

As may be understood, such activities are labor intensive.

An example of a delivery notice is shown in U.S. Pat. No. 6,021,942, entitled "Bar-Coded Label for 'Attempt to Deliver' Articles," issued Feb. 8, 2000, but this patent attempts to resolve issues of undeliverable parcels by providing a multi-sectioned form 10 which can be separated along various perforated section lines to allow portions of the form to be attached to the parcel and other portions to be left at the delivery address.

In light of the above, it may be seen that there is a need in the art to provide an improved method for providing package or other item delivery that is less labor intensive than the methods described above.

SUMMARY OF THE INVENTION

Generally described, the embodiments of the present invention provide a system for delivering a plurality of unique items each having unique identities and each having a different item code readable therefrom, the system comprising a plurality of delivery notices, each of the delivery notices including a delivery notice code thereon, each of the delivery notice codes being unique within the plurality of delivery notices, a code-reading device configured to read the delivery notice code from one of the delivery notices as well as to read the item code from each of the plurality of items, such that a delivery notice code is read and a plurality of item codes are read; and a code storing device, the device configured to store the delivery notice code and the plurality of item codes.

More particularly described, the embodiments of the present invention provide a method for delivering, to an intended recipient, a plurality of unique items each having unique identities and each having a different item code readable therefrom, the method including the steps of: providing a plurality of delivery notices, each of the delivery notices including a delivery notice code thereon, each of the delivery notice codes being unique within the plurality of delivery notices; attempting the delivery of the plurality of unique items at a designated address of the intended recipient under a set of predetermined delivery rules; delivering the items to the intended recipient if the delivery rules are met; retaining the items and proceeding to the following steps if the delivery rules are not met; reading the delivery notice code from one of the delivery notices and obtaining corresponding data associated with the delivery notice code; reading the item code from each of the plurality of items, and obtaining data associated with the plurality of items; linking the data associated with the delivery notice code with the data associated with the delivery notice code; reporting information regarding each of the plurality of unique items in response to receipt of a description of the one of the delivery notices from the intended recipient; and modifying delivery plans based upon subsequent instructions from the intended recipient.

Therefore it is an aspect of the present invention to provide a method of delivering parcels, mail or other similar items.

It is a further aspect of the present invention to provide a method of delivering parcels, mail or other similar items that is reliable.

It is a further aspect of the present invention to provide a method of delivering parcels, mail or other similar items that is efficient.

Therefore it is an object of the present invention to provide a method of delivering parcels, mail or other similar items that allows customers to obtain information about such items that were initially undeliverable.

Other objects, features, and advantages of the present invention will become apparent upon reading the following detailed description of the embodiments of the invention when taken in conjunction with the drawings and the appended claims.

BRIEF DESCRIPTION OF THE DRAWINGS

FIG. 1 is an illustrative view of a delivery agent 100 holding a plurality of parcels 110, 120, at the door of a typical address 123 Elm Street. As the parcels could not be delivered according to the agent's delivery rules, the agent has obtained information about a delivery notice 20 and the parcels 110, 120 and has left the notice 20 at the address 123 Elm Street. Such information may be obtained by use of, for example, a data acquisition device 30, a radio frequency identification ("RFID") reader (not shown), etc. In an alternate embodiment the intended recipient of the parcel may receive an email from the delivery service at an email address specified by the intended recipient indicating that a delivery has been attempted and such email may contain information about the attempted delivery.

FIGS. 3A and 3B are the first and second sides, respectively, of a delivery notice 20 according to an embodiment of the present invention. The notice in one embodiment is a piece of paper printed on both sides. The first side includes a machine-readable (first) delivery notice code 21, which corresponds to a human-readable (second) delivery notice code 22, which is in this case numerals, although it could be alphanumeric or any human readable format. Also included on the notice 20 is various other self-explanatory text on the notice in areas 23, 24, 25, 26, 27, and 29.

In one embodiment, the machine-readable (first) delivery notice code 21 is the same as the alphanumeric human-readable (second) delivery notice code 22. However, it should be noted that such human-readable and the machine-readable codes do not have to be the same codes, although they do need to be associated or "linked" in order to provide the needed link between the code read by the customer and the notice code scanned by the driver.

In other embodiments the delivery notice may be an RFID tag encoded with machine-readable information. Such an RFID tag delivery notice may be associated with human-readable information that is provided to the intended recipient.

In other embodiments the notice may be information transmitted to the intended recipient through means such as, for example, email, telephone, facsimile, wireless, radio frequency, etc.

Figure 4:
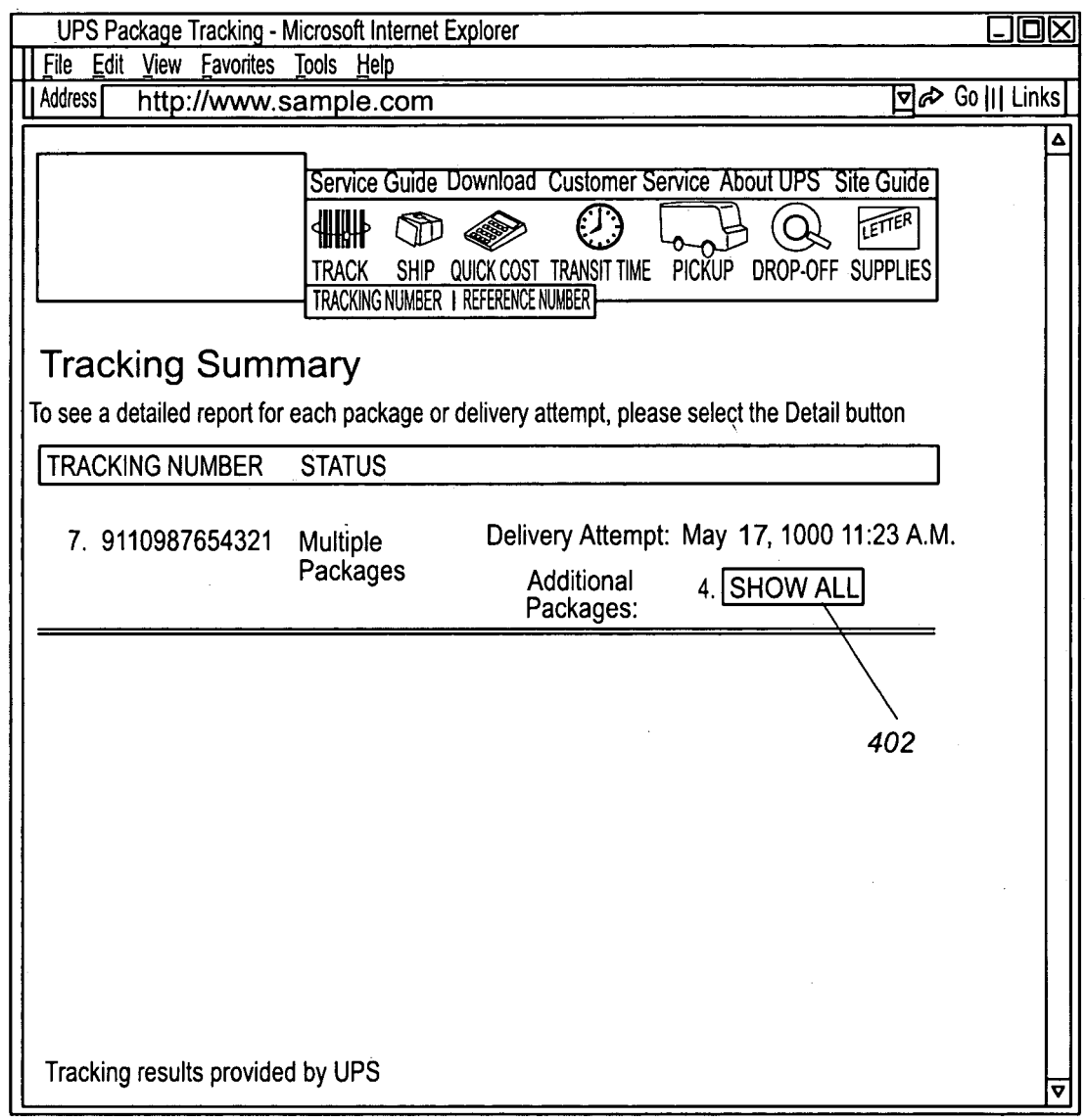

FIG. 4 shows a typical exemplary web page that the customer would see after entering the delivery notice code 22 which the customer read from the notice 20, which in this case is 9110987654321. The page, which could be referenced as the "Tracking Summary" page, shows that the delivery was attempted on May 17, 2000, at 11:25 A.M., and that four packages were in the attempted delivery. The customer can use the hyperlink at 402 to view that shown in FIG. 5.

Figure 5:
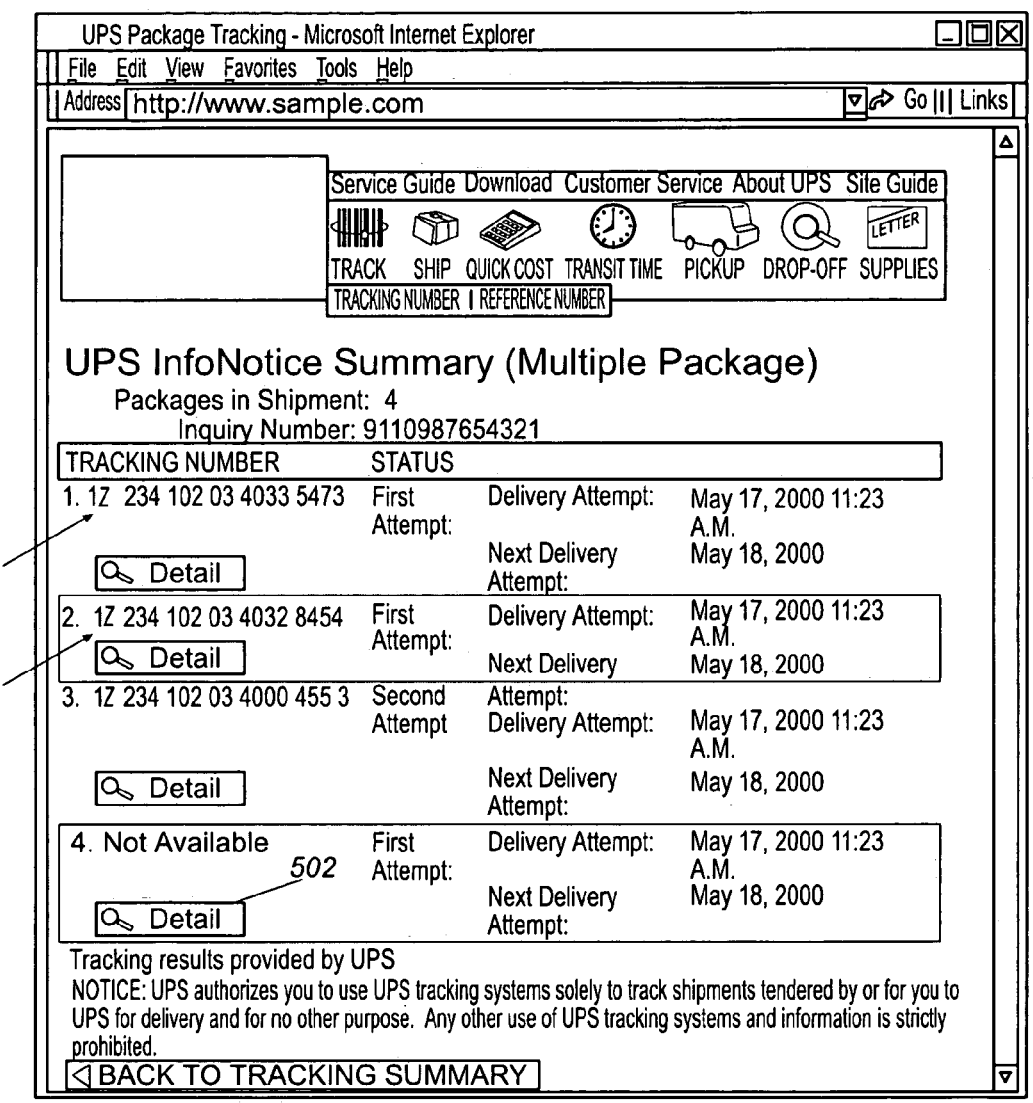

FIG. 5 shows a typical exemplary web page, entitled "UPS InfoNotice Summary (Multiple Package)", which shows more details of the four parcels shown related to notice code number 9110987654321. As may be seen, such details include the package tracking number (a.k.a. the "item code") for the individual packages, with the two exemplary parcel tracking numbers 111, 121, from FIG. 2 being denoted being shown as the first two packages in this list. As may also be seen, other package-related data is shown which is of informational value, such as when the delivery attempt was made, how many delivery attempts have been made, etc. Note that if further detail is required, the customer can select (or "click on") the hyperlink 502, to access a web page such as shown in FIG. 6.

Figure 6:
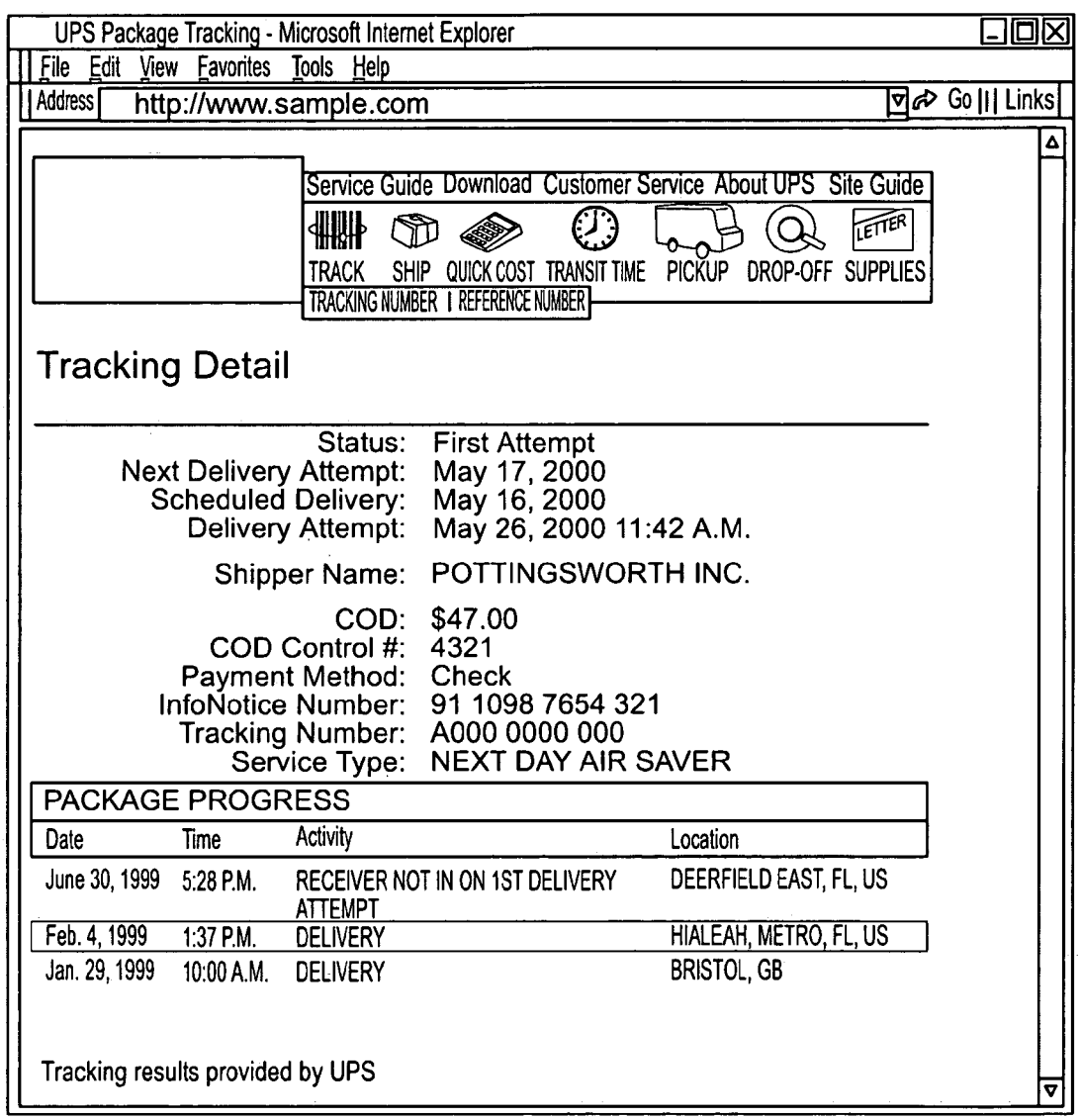

FIG. 6 is a web page 600 that shows many details relating to a certain particular parcel. As may be understood, such information can be helpful to a customer. As may be seen, this page, entitled "Tracking Detail", shows the status as "First Attempt", the next delivery attempt as May 17, 2000, the original scheduled delivery as May 16, 2000, etc. The customer may also specify separate, independent actions for each parcel related to a unique delivery notice code. For instance, if four parcels are associated with one delivery notice (and the delivery notice code), then the customer may specify, for example, an alternative delivery location for one parcel (i.e., a "Delivery Change Request"), return to sender for another parcel, redelivery for yet another parcel, and "will call" for the last parcel.

FIGS. 7A, 7B, 7C and 7D are screen-shots showing the ability to modify the delivery status of an individual parcel, in this case a delivery change request.

FIG. 8 shows a process 800 under the present invention in which the tracking system 10 is facilitated through the use of the Internet.

Figure 9:
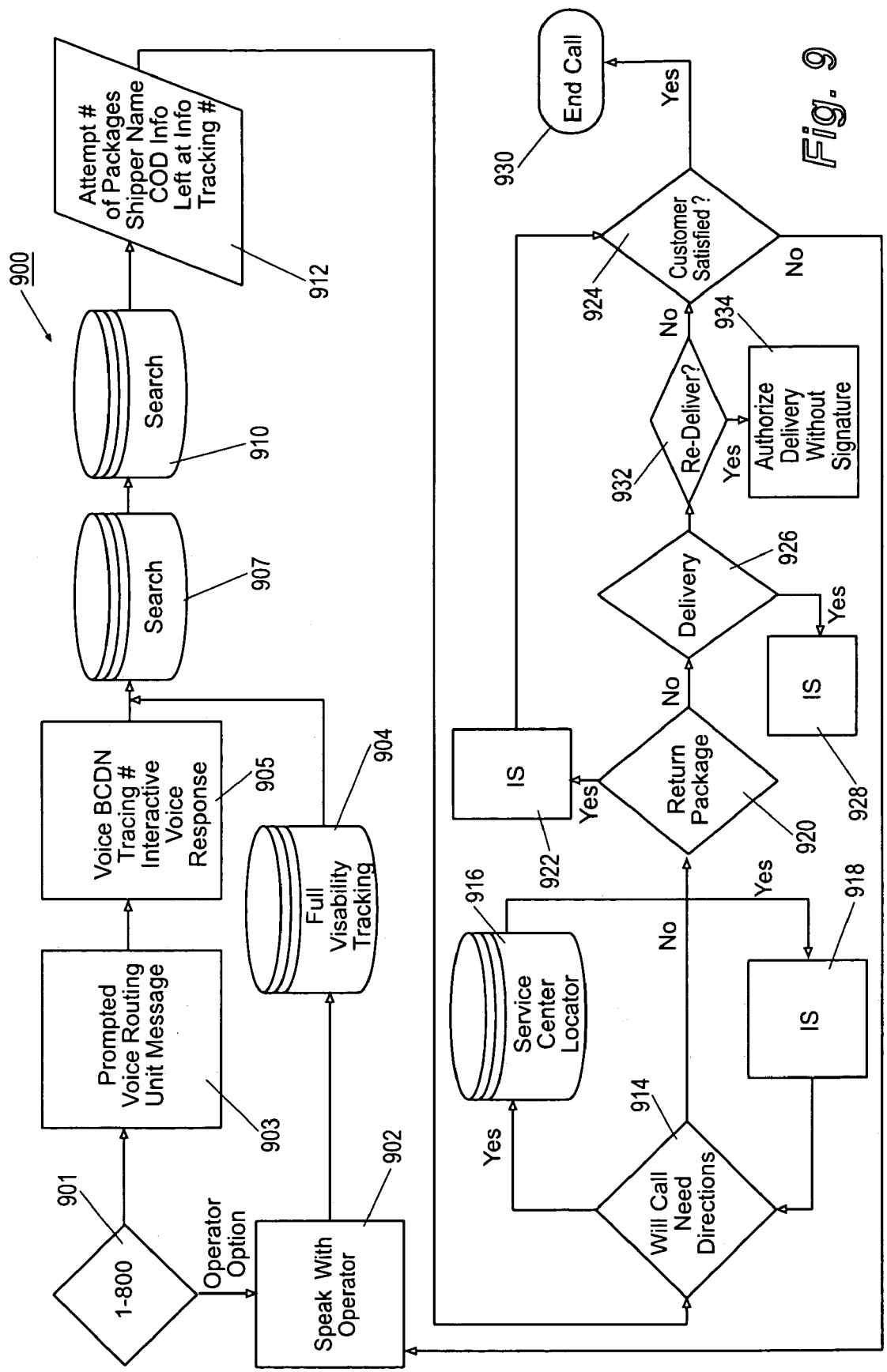

FIG. 9 is a flow chart of a process 900 in which the delivery notice is used by the customer in order to access a toll free number such as a "1-800" number.

DETAILED DESCRIPTION OF THE INVENTION

Reference is now made to the figures, in which like numerals indicate like elements throughout the several views.

General Discussion

Generally described, under on aspect of the invention, a single unique delivery notice is left at the particular location. However, just before it is left, this notice is "linked" to the parcel(s) that were undeliverable. This can be done by, for example, a handheld portable data acquisition device that includes a conventional scanning or reading means, allowing information to be read from the delivery notice as well as labels on the parcels, and stored on the handheld portable data acquisition device. It also may be done by merely writing down the human readable notice code and the human-readable item codes on the parcels and associating the item codes with the notice code. If ten parcels were undeliverable, only one delivery notice is left behind, but it is "linked" to all ten packages.

The intended recipient can then contact the delivery service via the Internet (or other suitable network) or by phone, by using information provided on the delivery notice. By providing the delivery service with unique information from the delivery notice, the intended recipient can get valuable information regarding the undelivered parcels. Such information may include, for example, shipper name, how many packages from each shipper, time of attempted delivery, COD status, etc. Arrangements can then be made to have the package(s) redelivered, held at a local operation center (i.e., "will call"), redirected, or returned. Additionally, the intended recipient may have established a personal profile of information on the delivery service's website. Such information may include, for example, instructions for the delivery service to deliver parcels to an alternative delivery location. For example, the delivery service may be instructed by information in the profile to redirect any parcels shipped to the intended recipient's home address during the work week to be delivered to the intended recipient's business address. Additional profile instructions may include an email address for the intended recipient so that an email is sent to the intended recipient, or their designee, when a delivery is attempted at a certain location. This email may include, for example, the notice code and a hyper-link to the delivery service's website so that the intended recipient may instruct the delivery service to take certain actions regarding the parcels that were attempted to be delivered. For example, the intended recipient may instruct the delivery service to have the parcel(s) redelivered, held at a local operation center, redirected, returned, or the intended recipient may provide authorization for the parcel(s) to be delivered or redelivered without requiring the delivery service to acquire a confirming signature at the delivery location.

In some instances, a user's personal profile may include a "signature on file." This allows the delivery service to make deliveries for that customer at the location designated by the customer without having to obtain a signature at the delivery location. In one embodiment, indicia may be located at the delivery location such that it can only be obtained by the delivery service if the delivery service actually goes to the delivery location, thus confirming the delivery service's presence at the delivery location and providing evidence of the delivery of the parcel(s). For instance, a barcoded label or placard may be installed at the customer's preferred delivery location that can be scanned by the delivery service's agent when making a delivery.

More Detailed Discussion

More detailed discussion is now made.

The Overall System

Figure 2:
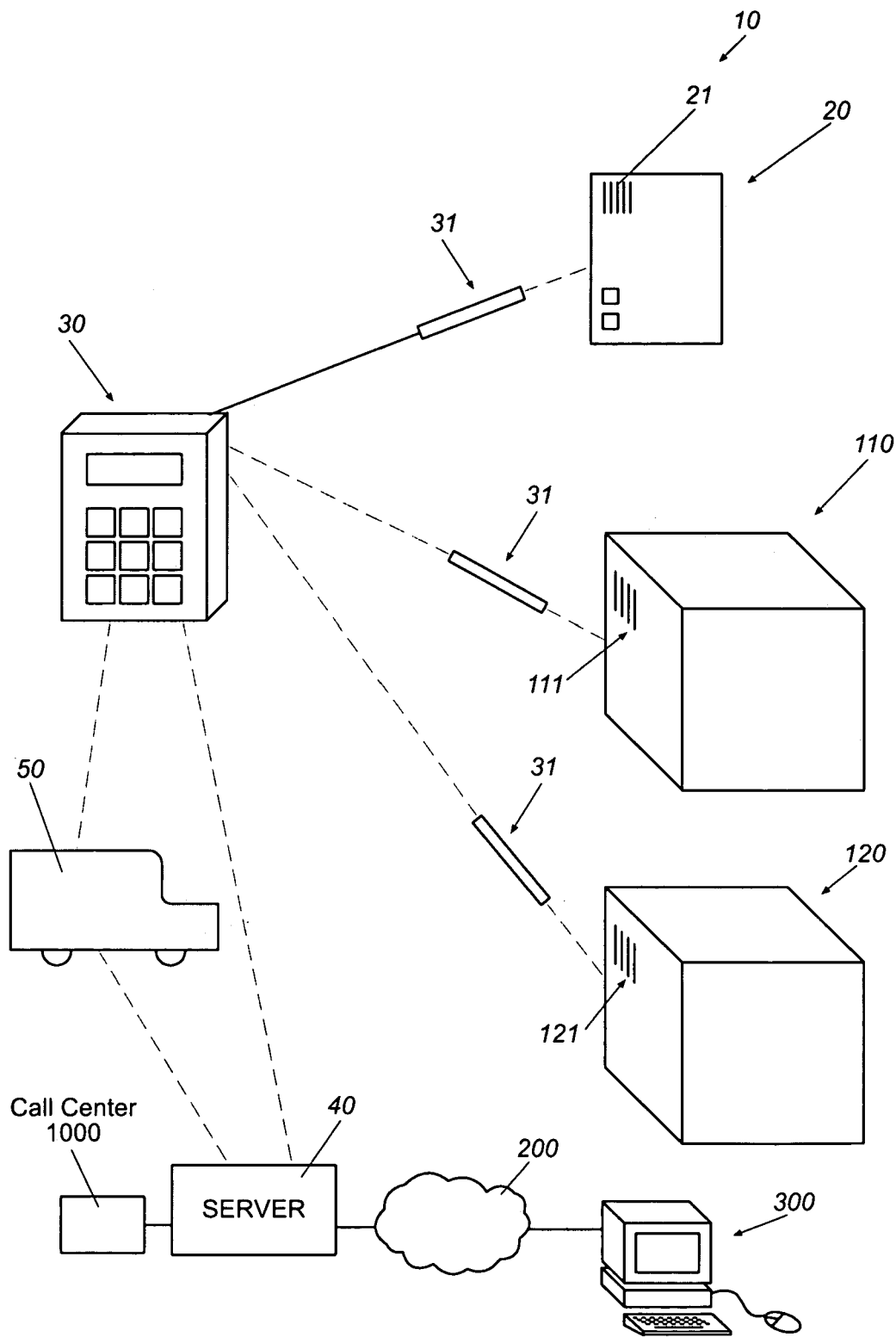
FIG. 2 is an illustrative view of the various data connections between various elements of an overall system 10 according to an embodiment of the present invention. The system 10 includes a delivery notice 20, a data acquisition device 30 having a scanning/reading element 31, and a server 40. In an alternate embodiment the system can also include a parcel delivery car 50. In another independent alternate embodiment the system can also include an Internet 200 connection or other suitable network connection to provide access to typical computers 300.

Reference is now first made to FIG. 2, which is an illustrative view of the various data connections between various elements of the overall system 10 according to an embodiment of the present invention. The system 10 includes a delivery notice 20, having a delivery notice code 21 thereon, a data acquisition device 30 and a server 40. The data acquisition device may have a scanning element 31, as shown, or it may have other means of acquiring data such as an RFID reader. In other embodiments a data acquisition device 30 may not be used and data may be acquired about the parcel or the delivery notice 20 merely by writing down human readable information about the delivery notice 20 and the parcel(s). As discussed in detail later, in an alternate embodiment the system can also include a parcel delivery car 50. Also as discussed in detail later, the system can also include an Internet 200 connection or other suitable network connection to provide access by customers (a.k.a. "users") to typical computers 300, or can include the use of a call center 1000.

If an Internet 200 connection is used, the customer may be able to establish a personal profile on the delivery service's website such that the delivery service will follow certain "rules" in that delivery of a parcel such as, for example, delivering the parcel to an alternative delivery location such as a business address, home address, or a retail postal facility (for example, Mail Boxes Etc., The UPS Store, etc. . . ) The intended recipient may also be able to designate in their profile that the delivery service send an email to a certain email address when an attempted delivery is made for a parcel for that intended recipient. The email may include, for example, information about the parcel to be delivered and information about the delivery notice 20, such as the delivery notice code 21, so that the intended recipient may access the delivery service's website and provide further direction to the delivery service regarding the disposition of the parcel(s).

Further, as previously described herein, the profile may also include a "signature on file" authorization that allows the delivery service to make a delivery at a location designated by the customer without having to obtain a signature at that location confirming the delivery.

The Delivery Notice 20

Figure 3A:

Reference is now made to FIGS. 3A and 3B, which combine to show one example of the type of delivery notices contemplated under an embodiment of the present invention, being a coded (e.g. bar coded) delivery notice 20. The notice in one embodiment is a piece of paper printed on both sides. The first side includes a machine-readable "first" delivery notice code 21, which corresponds to a human-readable "second" delivery notice code 22, which is in this case numerals, although it could be alphanumeric or any human readable format (in the embodiment shown the number is 9110987654321). Also included on the notice 20 is various other self-explanatory text on the notice in areas 23, 24, 25, 26, 27, and 29, with particular attention directed towards the text within area 26, which provides a telephone number to allow a person to call a telephone number to access tracking information at the web site shown.

In one embodiment the codes 21 and 22 are the same code or at least include common code portions, although the use of different although associated codes is also contemplated under the spirit and scope of the present invention. However, it should be noted that such human-readable and the machine-readable codes do not have to be the same codes, although they do need to be associated or "linked" in order to provide the needed link between the code read by the customer and the notice code scanned by the delivery agent 100. As an example, the two codes could be different but linked together back at, for example, a central server. Under one version of the prior art, a yellow delivery notice is used. It may be understood that the same or other colors could be used under the current invention.

In other embodiments, the delivery notice may be in other forms such as an encoded RFID tag that is encoded with a machine-readable delivery notice code 21. The RFID tag may be associated with human readable information such as the human readable delivery notice code 22. Other forms of a delivery notice include, for example, an electronic transmission such as email, a page, telephone call, etc. directed to the intended recipient (or their designee), with such transmission including the human readable delivery notice code 22. The transmission may also include a link or other information such that the intended recipient may access a network to obtain additional information about the parcel(s) such as tracking information and alter the disposition of the parcel(s).

The Packages

As shown in FIG. 2, the exemplary package 110 includes a machine-readable package code 111 (a.k.a. "item code"), which in one embodiment is a "tracking number" or "1Z" number as referenced by United Parcel Service, although obviously other package codes used to track or identify packages may also be used. The same is true for exemplary package 120 that includes a similar machine-readable package code 121. In both these cases in these embodiments the machine-readable package code is in the form of visible indicia, although other non-visible means such as an encoded RFID tag, magnetic media, sound, texture, or the like may also be used without departing from the spirit and scope of the invention. In both these cases in these embodiments the indicia is a bar code, although other codes are contemplated without departing from the spirit and scope of the invention.

The machine-readable package codes 111 and 121 are configured to be read by a code reader such as a bar code scanner or an RFID reader such as are known in the art, although other code readers are contemplated without departing from the spirit and scope of the invention.

Data Acquisition Device

Continuing to refer to FIG. 2, the system 10 according to an embodiment of the present invention also includes a data acquisition device 30 having a scanning element 31 (a.k.a. bar code reader) configured to scan the bar codes 21, 111, and 121 discussed above. In other embodiments the data acquisition device may include an RFID reader or have other devices capable of "reading" the respective types of notice codes 21 and package codes 111.

The data acquisition device 30 in an embodiment of the present invention may be such as known under the mark "DIAD", equipped with a suitable scanner 31 or other reader and loaded with the appropriate hardware and software suitable to perform the scanning or reading and data storage features noted below. Briefly stated, such scanning or reading capabilities include for example the capabilities to scan machine-readable codes such as bar codes or read an encoded RFID tag. The associated software and hardware include the capabilities of converting the readings from the scanner or reader to appropriate digital data for storage within the data acquisition device. The digital acquisition device should also include appropriate hardware and software to allow such digital data to be transferred from the data acquisition device to an external storage means such as a centralized computer server 40 such as known in the art.

Data acquisition may also be accomplished in other ways that do not necessarily involve a data acquisition device 30 such as, for example, writing down the human readable notice code and the human readable package code(s) that are to be associated with the delivery notice. These codes may later be entered into a computer database such that the notice code and the parcel code(s) are linked and the parcel(s) may be tracked and their disposition altered.

Server 40

Such a server 40 noted above can receive data from the data acquisition device through a direct route such as shown in dotted line, or through an indirect route also as shown in dotted line through hardware associated with the driver's package car 50. It should be understood that the type of connecting hardware or software is not essential to the present invention; many different types of data acquisition devices and transfer means may suffice.

Information on the server 40 is used to provide information for the intended package recipients through use of the Internet 200 (or other suitable network) or alternately by use of telephone call centers such as 1000. As discussed in later detail, the intended package recipients provide the human-readable delivery notice code 22 over the Internet or the telephone and receive information back about the undelivered parcel(s).

The server 40 is not necessarily a stand-alone server dedicated to the system 10. It may be a server that is already integrated into the delivery service's business. Furthermore, it may be comprised of one or more servers and the information utilized by the server 40 may be obtained from pre-existing databases developed in other areas of the delivery service's business.

The server 40 may also be utilized to send an electronic transmission to the intended recipient to notify them of the undelivered parcel(s). It may also allow an authorized intended recipient to modify certain information about the parcel(s), such as specifying an alternative delivery location, returning the parcel(s) to the sender, schedule redelivery, or have the parcel held at a service center for pick-up.

The Delivery Agent

Reference is now made to FIG. 1, which is an illustrative view of a delivery agent 100 holding a plurality of parcels 110, 120, at the door of a typical address 123 Elm Street. In the view shown, as the parcels could not be delivered according to the agent's delivery rules, the agent has obtained information from a delivery notice 20 by use of a data acquisition device 30 or by otherwise recording such information, and has left the notice 20 at the address 123 Elm Street. The agent will in this instance not leave the parcels 110, 120 at the address, but will retain them for a redelivery attempt, pick up by the intended addressee, or further disposition as directed by the intended addressee. This will now be discussed in detail in conjunction with an example (generally, a "Delivery Change Request").

EXAMPLE

It will first be assumed that a computer system from XYZ corporation is to be delivered in the form of two boxes, by a delivery agent 100 (working for a company such as, for example, UPS) such shown generally in FIG. 1, to a customer address at 123 Elm Street. It will be assumed that two parcels 110, 120, are to be delivered, with each parcel including a different machine-readable parcel code (a.k.a. "item code") readable therefrom. It will also be assumed that a signature is required to leave the parcels at the customer's address, unless the customer has a "signature on file" in their personal profile.

It will also be understood that the delivery agent will be equipped with at least a data acquisition device 30 and a delivery notice 20. Typically the delivery agent will carry a pad of multiple delivery notices.

The coded (e.g., bar coded) delivery notice 20 shown in FIGS. 3A and 3B is one example of the type of delivery notices contemplated under an embodiment of the present invention. The delivery notice includes, but it not limited to, a machine-readable delivery notice code 21, a human-readable delivery notice code 22 (in the embodiment shown the number is 9110987654321). In one embodiment the codes 21 and 22 are the same code or at least include common code portions, although the use of different although associated codes is also contemplated under the spirit and scope of the present invention. As an example, the two codes could be different but linked together back at, for example, the central server.

Approach to Delivery Location

As noted, the delivery location is at 123 Elm Street. The delivery agent 100 (a.k.a. "driver") such as shown in FIG. 1 will arrive at the 123 Elm Street address. The driver will then access or "pull up" the address on the data acquisition device 30, and will scan with scanner 31 the codes 111, 121 on both packages 110, 120, respectively. The driver will then press "Enter" on the data acquisition device 30. This may be understood as the machine scanning of a machine-readable "item code" or "parcel code". The driver will then attempt delivery of the two parcels.

Delivery Possible

If someone is at home, the parcels will be delivered, and a suitable entry is made in the data acquisition device 30 such as shown in FIGS. 1 and 2. The delivery notice is not used.

No Delivery Possible

If no one is at home, under the scenario presented above (a.k.a. the "predetermined rules"), the delivery agent cannot enter a signature, so the delivery agent makes an indication of non-delivery (e.g., a "not in" entry). At that time the data acquisition device will prompt the driver to scan a bar-coded delivery notice such as shown as 20 in FIGS. 2, 3A and 3B. The delivery agent will then pull a delivery notice out of his or her pocket or other suitable storage location, and then will scan, read or record the machine-readable delivery notice code portion 21 on the notice 20 with a device 31 capable of reading the machine-readable delivery notice code portion. The delivery notice 20, but not the parcels, is to be left at the door.

Unless such information is already entered, the driver can also fill out preliminary information such as the date, attempt no., COD status, any other needed information, and will then press "stop complete" on the data acquisition device. This completes the creation of a delivery stop record, which, under one embodiment of the present invention, may include but is not limited to the following data fields: package delivery address, item code, delivery notice code(s), time and date, consignee, COD information, etc.

At this point the there has been a link between the delivery notice and the tracking numbers on the two packages. The delivery notice 20 is left at the delivery address and the undelivered packages then go back into the delivery agent's vehicle.

Information about the attempted delivery is then transferred from the data acquisition device to the server. Alternatively, if information about the attempted delivery has only been recorded (e.g., written down) then the information may be entered into a data acquisition device and transferred to the server or it may be entered into a data entry device connected to the server.

When the intended recipient (a.k.a. "customer") comes home, he or she has the option of using at least two modes of communication with the delivery service (e.g. UPS); through a 1-800 line, or through the Internet at, for example, UPS.COM, MYUPS.COM, or another suitable location.

The Internet Connection

The customer may receive an email or some other form of electronic transmission that a parcel delivery has been attempted. The email will contain the delivery notice number and a hyper-link to the delivery service's website (such as UPS.COM or MYUPS.COM).

Under this mode of communication, the customer goes to UPS.COM or MYUPS.COM (or any other suitable Internet or network location) either through a hyper-link provided in an email or by accessing the website through a web-browser. The customer may have already created a personal profile of delivery preferences at such a website or the customer may now create such a profile. The profile may indicate, for example, a preferred alternate delivery location, an email address for notifying the customer of an attempted delivery, a "signature on file" authorizing delivery at a location without a confirming signature, etc. Otherwise, the customer may or may not choose to establish a personal profile. The customer's personal profile information will be stored on the server so that the customer is not required to re-enter the profile information. When ready to access information about the parcels, the customer clicks on a "delivery notice" or other suitable icon or location. Such clicking would direct the customer to a web page that will prompt for and allow entry of the delivery notice number.

By virtue of the above-referenced "link" between the delivery notice and the package information (which can be done through suitable database manipulation and control as known in the art) the customer can then be told by the delivery service that the customer has two packages which were previously undelivered. Any other relevant information can also be provided, such as information noting that the delivery service does not accept cash, and if a COD request is made, how and to whom payment should be made.

If desired, the individual parcel(s) can be tracked through current means associated with a tracking number.

At that time, the customer could then click on an icon associated with each individual parcel allowing the customer to be linked to suitable locations which would allow the customer to have the delivery service leave the parcel at a local delivery center, the customer could refuse the parcel, the customer could ask for future delivery, the customer could authorize delivery without a signature, or the customer could initiate a "delivery change request", in which the customer could key in a new address. Such a new address could be automatically checked for validity by the delivery agent software by suitable means, and if the address is valid the parcel could be sent to the new address. Furthermore, the customer could be provided with a list of commercial mail locations (e.g., Mail Boxes Etc., The UPS Store, etc.) near the customer's home or business location. The customer may select one of these proposed locations and have the parcel delivered by the delivery service at such location or the customer may be able to enter an address of another location for delivery of the parcel.

Reference is now made to exemplary web pages that may be used to facilitate such interaction between the customer and the delivery service. FIG. 4 shows a typical exemplary web page that the customer would see after entering the delivery notice code 22 which the customer read from the notice 20, which in this case is 9110987654321. The page, which could be referenced as the "Tracking Summary" page, shows that the delivery was attempted on May 17, 2000, at 11:25 A.M., and that four packages were in the attempted delivery. The customer can use the hyperlink at 402 to view that shown in FIG. 5.

FIG. 5 shows a typical exemplary web page, entitled "UPS InfoNotice Summary (Multiple Package)," which shows more details of the four parcels shown related to the notice code number 9110987654321. As may be seen, such details include the package tracking number (a.k.a. the "item code") for the individual packages, with the two exemplary parcel tracking numbers 111, 121, from FIG. 2 being denoted being shown as the first two packages in this list. As may also be seen, other package-related data is shown which is of informational value, such as when the delivery attempt was made, how many delivery attempts have been made, etc.

For example, the first package listed has a package tracking number 111 of 1Z2341020340335473, the notice is associated with its first delivery attempt, this delivery attempt was May 17, 2000 at 11:23 AM, and its next delivery attempt will be at May 18, 2000.

The second package listed has a package tracking number 121 of 1Z2341020340328454, the notice is associated with its first delivery attempt, this delivery attempt was May 17, 2000 at 11:23 AM, and its next delivery attempt will be at May 18, 2000.

The third package listed has a package tracking number of 1Z2341020340004553, the notice is associated with its second delivery attempt, this delivery attempt was May 17, 2000 at 11:23 AM, and its next delivery attempt will be at May 18, 2000.

The fourth (and last) package listed has a package tracking number which is unavailable, the notice is associated with its first delivery attempt, this delivery attempt was May 17, 2000 at 11:23 AM, and its next delivery attempt will be at May 18, 2000.

As noted above, two attempts have been made to deliver the third package. It may be understood that it may also be possible that this package may have another earlier-in-time delivery notice associated with it corresponding to that earlier delivery attempt. If the customer uses the earlier-in-time delivery notice, then the same, most current, parcel information will be shown to the customer for the parcels associated with the earlier-in-time delivery notice.

Note that if further detail is required, the customer can use or "click" on the hyperlink 502, to access a web page such as shown in FIG. 6.

FIG. 6 is a web page 600 that shows many details relating to a certain particular parcel. As may be understood, such information can be helpful to a customer. As may be seen, this page, entitled "Tracking Detail", shows the status as "First Attempt", the next delivery attempt as May 17, 2000, the original scheduled delivery as May 16, 2000, etc.

Figure 7A:
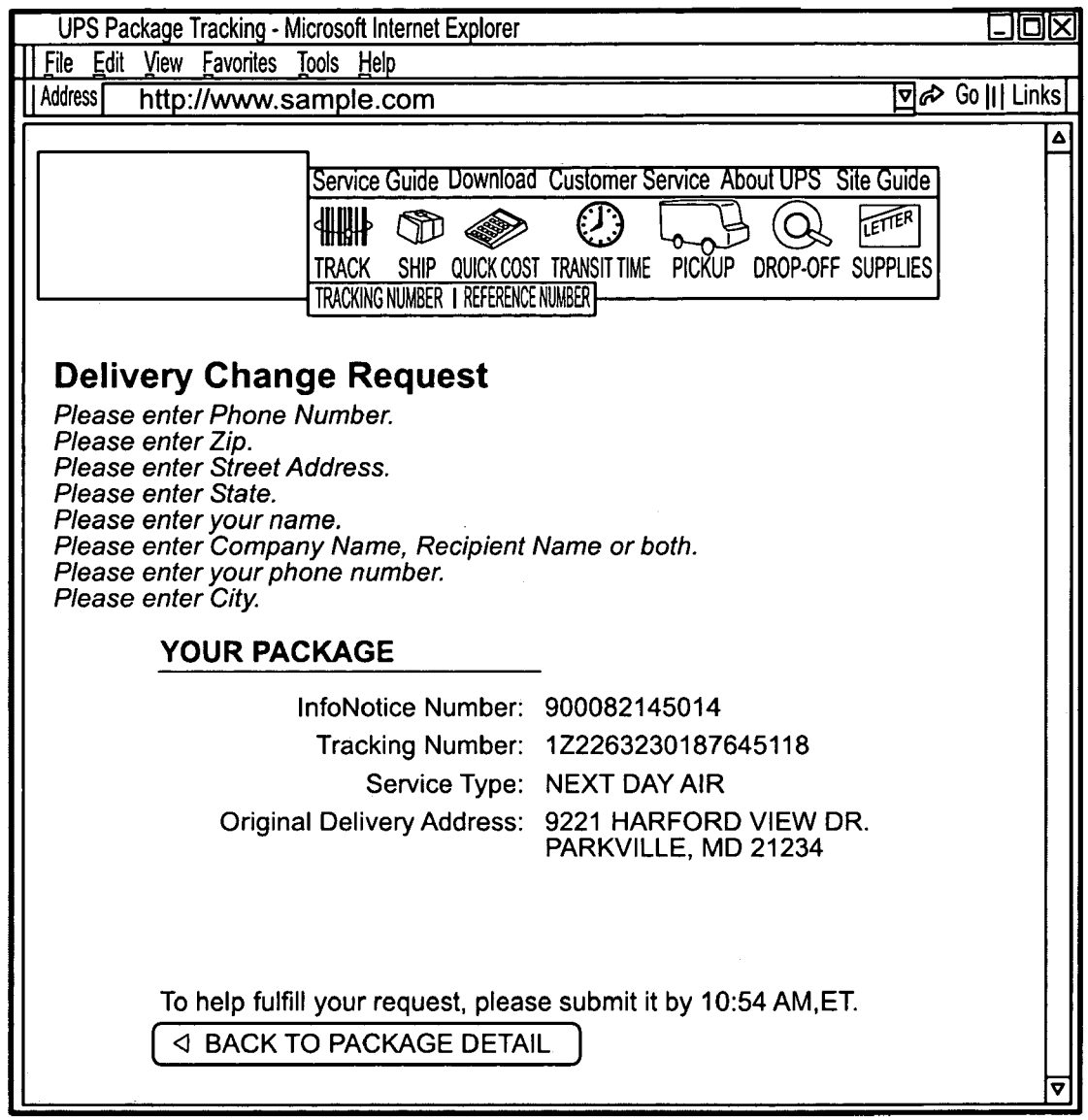

FIG. 7A illustrates a screen-shot of a web page in an embodiment of the invention that indicates the customer has not provided all of the required information when making a request through an Internet system that the package be delivered to an alternate location of a parcel.

Figure 7B:
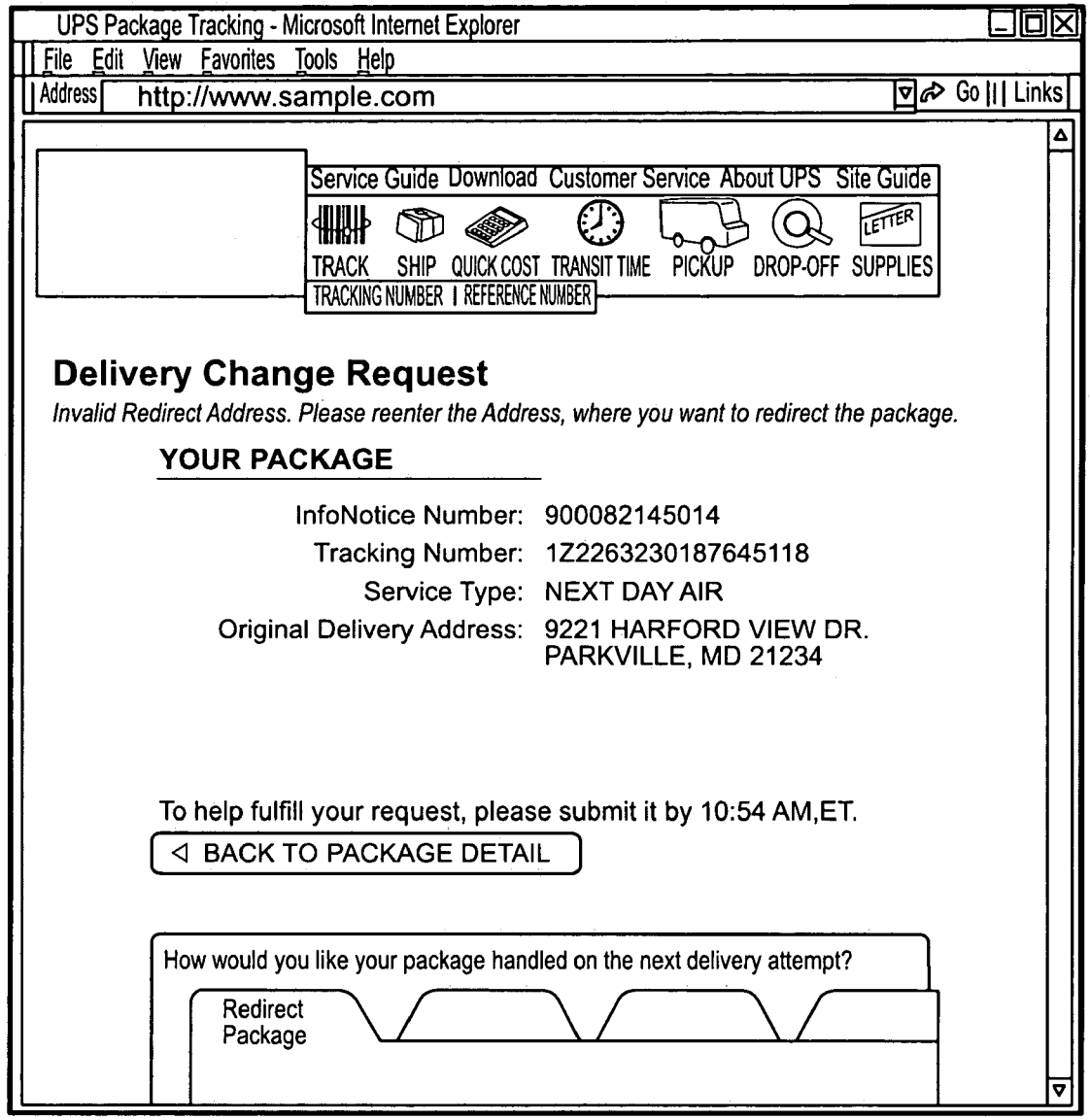

FIG. 7B illustrates a screen-shot of a web page in an embodiment of the invention that indicates that the customer has provided an invalid city, state, or zip code entry when making a request through an Internet system that the package be delivered to an alternate location of a parcel.

Figure 7C:
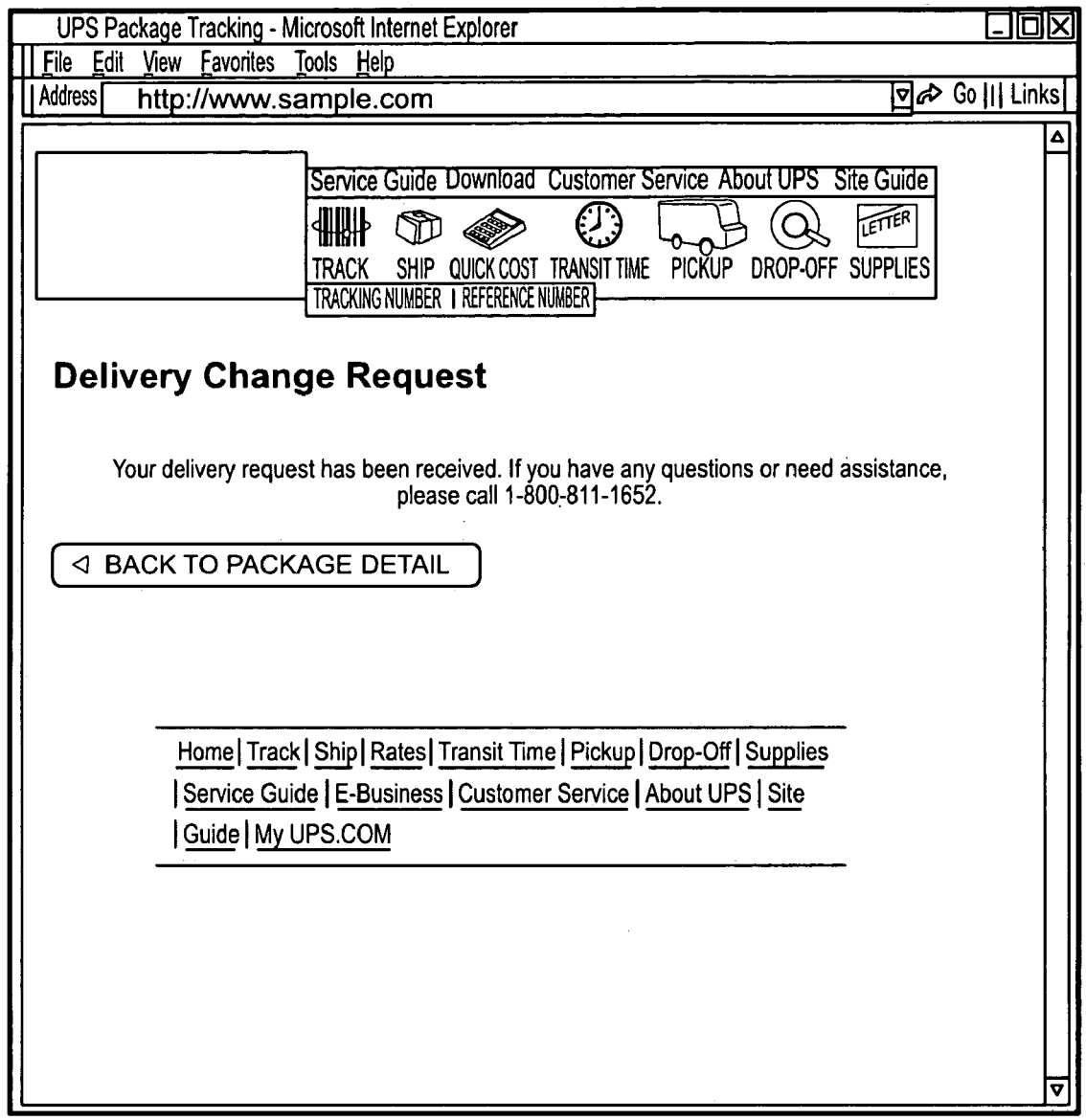

FIG. 7C illustrates a screen-shot of a web page in an embodiment of the invention that indicates and confirms that the customer has successfully completed a Delivery Change Request when making a request through an Internet system that the package be delivered to an alternate location of a parcel.

Figure 7D:
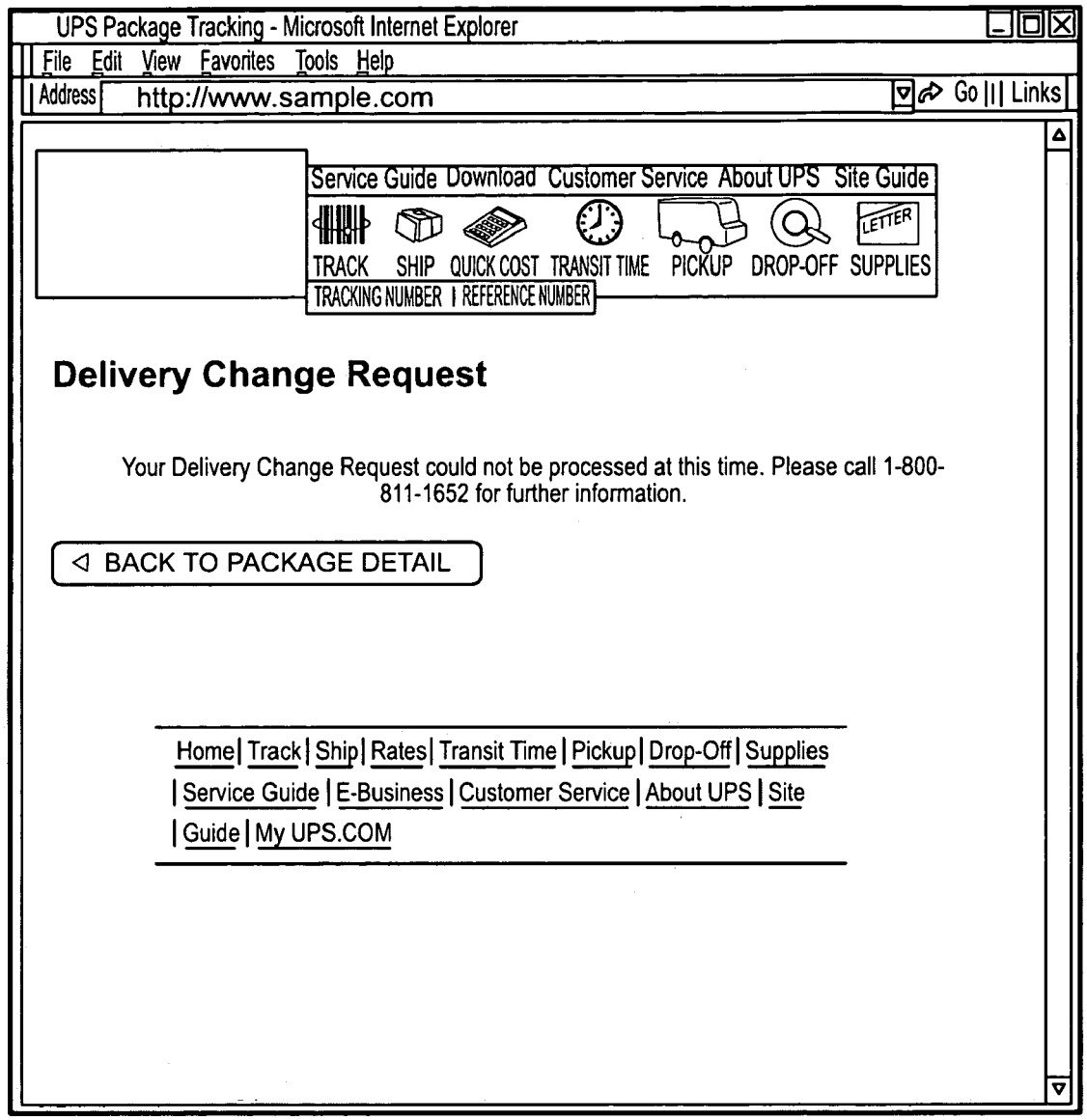

FIG. 7D illustrates a screen-shot of a web page in an embodiment of the invention that indicates that the customer has unsuccessfully submitted a Delivery Change Request when making a request through an Internet system that the package be delivered to an alternate location of a parcel.

FIG. 8 shows a process 800 under the present invention in which the tracking system 10 is facilitated through the use of the Internet.

At step 801, the customer begins access to the tracking system 10 by accessing the URLs www.ups.com, or www-.myups.com, or any other suitable location. As previously provided, the customer may be able to establish a personal profile on the delivery service's website that includes parcel delivery preferences.

At step 803, the customer selects a particular tracking feature within the overall web site.

At step 805, the customer enters the delivery notice code 22 that the customer read from the notice 20 (which in the case described above was 9110987654321), and selects the necessary icon or other selection to send the delivery notice code 22 to the tracking system 10.

At step 807, the tracking system checks a database for delivery addresses.

At step 810, the tracking system checks a database for customer records.

At step 812, the tracking system presents certain information to the customer such as the information set forth in FIGS. 4–6. At this point, the customer may need no further information, such as in the case where the customer is aware of the time for the next delivery attempt. If this is the case, the customer will pass through steps 820, 824, 826, 828, and 830, in many cases simply by moving to another web page or by logging off the Internet.

However, it may be possible that the customer would like to call upon the service center where the parcel(s) are being held until the next delivery attempt, instead of waiting for delivery. In this case, step 814 allows the customer to execute a "Will Call" instruction to the tracking system 10. If the customer needs directions to the service center, step 818 allows for a web-based search and location function, based upon, for example, the customer's ZIP code. The customer will provide a delivery notice, a delivery notice number and/or some form of valid identification in order to retrieve the parcel(s) from the service center.

Step 816 is a step which includes the use of a IS (information systems) tool which allows the customer (through adequate protection) to modify the records of the tracking system 10 relative to the item. In this case, if a "Will Call" is placed on the item, the item is to be held at a designated service center and step 816 modifies the records of the tracking system 10 to so reflect this instruction.

If the customer wants to return the package at decision step 820, step 822 is selected which allows for the records of the tracking system 10 to so reflect this instruction.

If the customer does not want to return the package, but wants to attend to alternate delivery at step 824, step 822 is selected, which as discussed above in reference to step 816, allows for the records of the tracking system 10 to so reflect this instruction.

If the customer wants the delivery service to re-deliver the parcels at the customer's desired delivery location, but the customer wants to authorize the delivery service to make such a delivery without having to obtain a signature confirming delivery at the customer's desired delivery location, then step 828 is selected. Step 832 allows an intended recipient to authorize the delivery of the parcel(s) without requiring the delivery service to obtain a signature.

If at decision step 826 the customer wishes to enter another notice code, the customer is redirected to step 803. If not, the process (a.k.a. "call") is over.

The 1(800) Connection

As noted elsewhere, the customer will have a 1(800) telephone number provided by the delivery notice. Speech recognition software or prompts for entry of telephone keypad signals can allow a customer to have the delivery service leave the parcel at a local delivery center, to allow the customer to refuse the parcel, allow the customer to request ask for future delivery, or to make a "delivery change" request. The customer will also have the ability to be opted out to a live operator if so desired.

Reference is now made to FIG. 9, which is a flow chart of a particular process 900 in which the delivery notice is used by the customer in order to access a toll free number such as a "1-800" number.

The first step in process 900 is step 901, in which the customer dials the toll free number and is connected. Typically the toll free number will be on the delivery notice.

If the customer wishes to speak to a live operator, step 902 is executed, and full visibility tracking is provided to the customer at step 904. This brings up information such as shown in FIGS. 4–6, but also additional information in the system that the operator deems needed. If full visibility tracking is not needed, step 907 is reached.

If the customer does not elect to opt out of automatic features, the process goes to step 903.

At step 903, a process begins which requests the customer to speak their notice code such as "please speak your notice code clearly at the beep".

At step 905, the instructions given by the customer are interpreted and converted into information such as the notice code. The system then has the notice code and proceeds to provide information relative thereto as described further herein.

At step 907, the tracking system checks a database for delivery addresses.

At step 910, the tracking system checks a database for customer records.

At step 912, the tracking system (through an automated menu-based response system) presents certain information to the customer such as the information set forth in FIGS. 4–6. At this point, the customer may need no further information, such as in the case where the customer is aware of the time for the next delivery attempt. If this is the case, the customer will pass through steps 920, 926, 924, and 930, in many cases simply by hanging up the phone.

However, it may be possible that the customer would like to call upon the service center where the parcel(s) are being held until the next delivery attempt, instead of waiting for delivery. In this case, step 914 allows the customer to execute a "Will Call" instruction to the tracking system 10. If the customer needs directions to the service center, step 916 allows for a telephonic-based search and location function, based upon, for example, the customer's ZIP code.

At step 918, the "Will Call" instructions can be added to the system as discussed elsewhere.

If the customer wants to return the package at decision step 920, step 922 is selected which allows a corresponding update to the system.

If at step 926, the customer wishes to elect future delivery or a delivery change request, step 928 may be selected to update the system.

If the customer wants the delivery service to re-deliver the parcels at the customer's desired delivery location, but the customer wants to authorize the delivery service to make such a delivery without having to obtain a signature confirming delivery at the customer's desired delivery location, then step 932 is selected. Step 934 allows an intended recipient to authorize the delivery of the parcel(s) without requiring the delivery service to obtain a signature.

If at step 924, the customer is not satisfied, the customer will be routed to step 902 to speak with an operator. If at step 924, the customer is satisfied, the customer can end the call.

Discussion of Terms

It should be understood that the term "scan" should be interpreted generally to mean the machine reading of a machine-readable code. This may include the type of bar code "scanning" in which a user moves a stylus across a bar code, but could also be interpreted to mean the use of a snapshot or other image grab which is then analyzed for bar code or other code presence and decoding as known in the art. It could also generally refer to the reading of a machine-readable code such as by using an RFID reader to read a RFID tag.

It should be understood that the system contemplates the use of a number (a.k.a. "plurality") of delivery notices, with each of the delivery notices including a machine-readable delivery notice code thereon, and each of said delivery notice codes being unique within the number of delivery notices used at least with respect to a subset of deliveries. This is not to say that the same delivery notice code may never be re-used, but it is preferred that the same delivery notice code would not be used for some amount of time to preclude the possibility of confusion. A delivery notice should also be understood to take many forms such as, for example, a piece of paper left at the intended recipients address, an RFID tag, an email notification, etc. It should be understood that the term "link" is used to denote an association between elements that can later be recalled. An "electronic link" between data includes the linking (with the appropriate linking software) of a "first" type of data (data in a first database field, e.g., delivery notice identification data) with a "second" type of data (data in a second database field, e.g., package identification data), such that the recall of the first type of data, when used with the appropriate linking software, allows for ready recall of the second type of data.

Alternatives

Note that the data acquisition device shown is used as an example, other data acquisition devices may be used under the invention or a data acquisition device may not be used and the delivery notice code and the packages code(s) may be entered into a data entry device connected to the server and associated on the server.

CONCLUSIONS

While this invention has been described in specific detail with reference to the disclosed embodiments, it will be understood that many variations and modifications may be effected within the spirit and scope of the invention as described in the appended inventive concepts.

What is claimed:

1. A method for delivering a plurality of unique items each having a unique identity and having a different item code readable therefrom, said method including the steps of:
    A) providing a plurality of delivery notices, each of said delivery notices including a delivery notice code thereon, each of said delivery notice codes being unique within said plurality of delivery notices;
    B) reading said delivery notice code from one of said delivery notices;
    C) reading said item code from each of said items; end
    D) linking said delivery notice code with said item code from each of said items.

2. A method for delivering a plurality of unique items each having a unique identity and having a different machine-readable item code readable therefrom, said method including the steps of:
    A) providing a plurality of delivery notices, each of said delivery notices including a delivery notice code thereon, each of said delivery notice codes being unique within said plurality of delivery notices;
    B) reading said delivery notice code from one of said delivery notices;
    C) reading said item code from one of said items;
    D) linking said delivery notice code with said item code;
    E) reporting information regarding the item in response to receipt of a description of said one of said delivery notices from an intended recipient; and
    F) modifying delivery plans of said item based upon subsequent instructions from said intended recipient.

3. A method for delivering a plurality of unique items each having a unique identity and having a different machine-readable item code readable therefrom, said method including the steps of:
    A) providing a plurality of delivery notices, each of said delivery notices including a delivery notice code thereon, each of said delivery notice codes being unique within said plurality of delivery notices;

B) reading said delivery notice code from one of said delivery notices;

C) reading said item codes from each of said items;

D) linking said delivery notice code with said item codes;

E) reporting information regarding the items in response to receipt of said delivery notice code from an intended recipient; and F) modifying delivery plans of said items based upon subsequent instructions from said intended recipient.

4. A method of altering the redelivery plans of an item having an item code that is associated with a delivery notice code on a delivery notice that is provided to an intended recipient when an attempted delivery of said item by a delivery service has been unsuccessful, comprising:

A) contacting the delivery service;

B) using said delivery notice code tat is associated with said item code to access information about said item wherein said information includes redelivery plans for said item and said delivery notice code is not the same as said item code; and C) modifying the redelivery plans for said item based upon subsequent instructions from said intended recipient.

5. The method of claim 4 wherein the subsequent instructions from said intended recipient comprise authorizing the redelivery of the item by the delivery service at a location without obtaining a delivery-confirming signature at the location.

6. The method of claim 4, wherein contacting the delivery service is performed by a telephone system.

7. The method of claim 4, wherein contacting the delivery service is performed by an Internet system.

8. The method of claim 4, wherein instructions received from said intended recipient are received through a telephone system.

9. The method of claim 4, wherein instructions received from said intended recipient are received through an Internet system.

10. A method for delivering a unique item having a unique identity and having a unique item code readable therefrom, said method including the steps of:

A) providing a plurality of delivery notices, each of said delivery notices including a delivery notice code thereon and each of said delivery notices being an RFID tag, each of said delivery notice codes being unique within said plurality of delivery notices;

B) reading said delivery notice code from one of said delivery notices;

C) reading said item code from the item; and

D) linking said delivery notice code with said item code.

11. A method for delivering a unique item having a unique identity and having a unique item code readable therefrom, said method including the steps of:

A) providing a plurality of delivery notices, each of said delivery notices including a delivery notice code thereon, each of said delivery notice codes being unique within said plurality of delivery notices;

B) reading said delivery notice code from one of said delivery notices;

C) reading said item code from the item wherein said item code is encoded on an RFID tag; and D) linking said delivery notice code with said item code.

12. A method for delivering a unique item having a unique identity and having an item code readable therefrom, said method including the steps of:

A) providing a plurality of delivery notices, each of said delivery notices including a delivery notice code thereon and each of said delivery notices being an REID tag, each of said delivery notice codes being unique within said plurality of delivery notices;

B) reading said delivery notice code from one of said delivery notices;

C) reading said item code from the item wherein said item code is encoded on an RFID tag; and D) linking said delivery notice code wit said item code.

13. A method of notifying an intended recipient of an item of an unsuccessful attempted delivery of an item, comprising:

A) reading an item code from the item;

B) linking a delivery notice code with said data associated with said item; and

C) sending an electronic transmission to the intended recipient, wherein said transmission includes the delivery notice code.

14. A method of delivering an item to an intended recipient after an unsuccessful attempted delivery of the item, comprising:

A) reading an item code from the item;

B) linking a delivery notice code with said item code;

C) sending an electronic transmission to the intended recipient, wherein said transmission includes the delivery notice code;

D) using the delivery notice code to access information about said item wherein said information includes delivery plans for the parcel; and E) modifying the delivery plans for the parcel based upon subsequent instructions received from said intended recipient.

15. A method of delivering an item to an intended recipient after an unsuccessful attempted delivery of the item, comprising:

A) reading an item code from the item;

B) linking a delivery notice code with said hem code;

C) sending an email to the intended recipient, wherein said email includes the delivery notice code;

D) receiving from said intended recipient the delivery notice code and allowing access to information about said item wherein said information includes delivery plans for the parcel; and E) modifying the delivery plans for the parcel based upon subsequent instructions received from said intended recipient.

16. A method of delivering an item to an intended recipient, wherein the intended recipient has indicated preferences for the delivery of items shipped to the intended recipient, comprising:

A) providing an Internet website that may be accessed by the intended recipient;

B) allowing the intended recipient to enter certain delivery preference information at said website, wherein such information relates to the intended recipient's preferences for the delivery of items;

C) storing the intended recipient's delivery preference information on a server;

D) receiving an item for delivery to the intended recipient;

E) retrieving the intended recipient's delivery preference information; and

F) delivering the item while adhering to the delivery preference information.

17. The method of claim 16, wherein the delivery preference information includes an address for an alternative delivery location for an item to be delivered to the intended recipient.

18. The method of claim 17, wherein the alternative delivery location includes retail postal facilities.

19. The method of claim 16, wherein the delivery preference information includes an intended recipient's email address so that the intended recipient may be notified of the delivery or attempted delivery of an item.

20. The method of claim 16, wherein the delivery preference information includes an authorization to deliver the item without obtaining a signature at the delivery location.

21. A method for delivering, to an intended recipient, a plurality of unique items each having unique identities and each having a different item code readable therefrom, said method including the steps of:
   A) providing a plurality of delivery notices, each of said delivery notices including a delivery notice code thereon, each of said delivery notice codes being unique within said plurality of delivery notices;
   B) attempting the delivery of said plurality of unique items at a designated address of said intended recipient under a set of predetermined delivery rules;
   C) delivering said items to said intended recipient if said delivery rules are met;
   D) retaining said items and proceeding to the following steps if said delivery rules are not met;
   E) reading said delivery notice code from one of said delivery notices;
   F) reading said item code from each of said plurality of items;
   G) linking said delivery notice code with said item code from each of said plurality of items;
   H) reporting information regarding each of said plurality of unique items in response to receipt of a description of said one of said delivery notices from said intended recipient; and
   I) independently modifying a delivery plan of one item of said plurality of items based upon subsequent instructions from said intended recipient.

22. A method for providing possession of an item to an intended recipient following a failed delivery attempt of the item, said method comprising the steps of:
   A) providing a machine-readable indicia associated with the item;
   B) providing indicia associated with obtaining possession of the item differing from the indicia associated with the item; and
   C) associating the two indicia, such that the indicia associated with obtaining possession of the item can be used to obtain the item.

23. A method for providing possession of an item to au intended recipient comprising:
   A) processing a plurality of items;
   B) notifying an intended recipient of an item that said item has been processed and is ready for delivery;
   C) receiving information from the intended recipient that is requesting to receive the item;
   D) identifying the item based on the information received from the intended recipient;
   E) verifying that the intended recipient is authorized to receive the item, based on the identification of the item; and
   F) providing possession of the item to the intended recipient if the intended recipient is authorized to receive the item.

24. The method of claim 23, wherein receiving the information from the intended recipient that is requesting to receive the item includes receiving an associated delivery notice with an associated unique indicia.

25. The method of claim 23, wherein verifying the intended recipient is authorized to receive the item based on the identification of the item comprises determining that the information received from the intended recipient that is requesting to receive the item is consistent wit an associated delivery notice having an associated unique indicia.

26. The method of claim 25, wherein the associated unique indicia is represented by a machine-readable indicia.

27. The method of claim 26, wherein the machine-readable indicia is represented by a barcode.

28. The method of claim 23, wherein notifying the intended recipient of an item that said item has been processed and is ready for delivery comprises providing a delivery notice comprising a form with a machine-readable indicia for item identification.

29. The method of claim 28 wherein the machine-readable indicia is represented by a barcode.

30. A method for providing possession of an item to an intended recipient comprising:
   A) processing a plurality of items;
   B) attempting delivery of an item to an intended recipient at a first location with said attempted delivery unsuccessful;
   C) providing the item with an item indicia;
   D) providing the intended recipient with a notification having a notification indicia at the first location;
   E) associating the item indicia with the notification indicia;
   F) transporting the item that has been processed to a second location;
   G) receiving notification indicia from the intended recipient that is requesting to receive the item;
   H) identifying the item based on the notification indicia received from the intended recipient;
   I) verifying that the intended recipient is authorized to receive the item, based on the identification of said item; and
   J) providing the item to the intended recipient at the second location, if intended recipient is authorized to receive the item.

31. A method for delivering a plurality of unique items each having a unique identity and having a different machine-readable item code readable therefrom, said method including the steps of:
   A) providing a plurality of delivery notices, each of said delivery notices including a delivery notice code thereon, each of said delivery notice codes being unique within said plurality of delivery notices;
   B) reading said delivery notice code from one of said delivery notices;
   C) reading said item code from one of said items;
   D) linking said delivery notice code with said item code;
   E) reporting information regarding the item in response to receipt of a description of said one of said delivery notices from an intended recipient; and
   G) modifying delivery plans of said item based upon subsequent instructions from said intended recipient by delivering the item at a location without obtaining a delivery-confirming signature at the location.

32. A method for delivering a plurality of unique items each having a unique identity and having a different machine-readable item code readable therefrom, said method including the steps of:
- A) providing a plurality of delivery notices, each of said delivery notices including a delivery notice code thereon, each of said delivery notice codes being unique within said plurality of delivery notices;
- B) reading said delivery notice code from one of said delivery notices;
- C) reading said item codes from each of said items;
- D) linking said delivery notice code with said item codes;
- E) reporting information regarding the item in response to receipt of a description of said one of said delivery notices from an intended recipient; and
- F) modifying delivery plans of said item based upon subsequent instructions from said intended recipient by delivering the item at a location without obtaining a delivery-confirming signature at the location.

* * * * *

UNITED STATES PATENT AND TRADEMARK OFFICE
CERTIFICATE OF CORRECTION

PATENT NO. : 6,994,253 B2 Page 1 of 1
APPLICATION NO. : 10/689514
DATED : February 7, 2006
INVENTOR(S) : Miller et al.

It is certified that error appears in the above-identified patent and that said Letters Patent is hereby corrected as shown below:

Column 14,
Line 41, "end" should read --and--.

Column 16,
Line 10, "wit" should read --with--.

Column 17,
Line 53, "au" should read --an--.

Column 18,
Line 9, "wit" should read --with--.

Signed and Sealed this

Fifth Day of September, 2006

JON W. DUDAS
*Director of the United States Patent and Trademark Office*